United States Patent
Riggio et al.

(10) Patent No.: US 8,896,263 B2
(45) Date of Patent: Nov. 25, 2014

(54) CRITICAL MODE CONTROL DISCONTINUOUS MODE BOOST-BUCK CHARGER

(75) Inventors: Chris Riggio, Longmont, CO (US); Brian Houghton, Littleton, CO (US)

(73) Assignee: Eetrex, Inc., Boulder, CO (US)

( * ) Notice: Subject to any disclaimer, the term of this patent is extended or adjusted under 35 U.S.C. 154(b) by 329 days.

(21) Appl. No.: 13/458,710

(22) Filed: Apr. 27, 2012
(Under 37 CFR 1.47)

(65) Prior Publication Data
US 2013/0038273 A1    Feb. 14, 2013

Related U.S. Application Data

(60) Provisional application No. 61/479,818, filed on Apr. 27, 2011.

(51) Int. Cl.
*H02J 7/00* (2006.01)
*H02J 7/14* (2006.01)
*H02J 7/02* (2006.01)
*H02M 3/158* (2006.01)
*B60L 11/18* (2006.01)

(52) U.S. Cl.
CPC ............... *H02J 7/00* (2013.01); *Y02T 90/127* (2013.01); *Y02T 10/7225* (2013.01); *H02J 7/022* (2013.01); *Y02T 10/7233* (2013.01); *B60L 2210/12* (2013.01); *H02M 3/1582* (2013.01); *B60L 11/1812* (2013.01); *Y02T 10/7088* (2013.01); *Y02T 10/7005* (2013.01); *B60L 2210/14* (2013.01); *H02J 7/0065* (2013.01); *H02M 3/1584* (2013.01); *Y02T 90/14* (2013.01)
USPC ............ 320/107; 320/104; 320/109; 320/128

(58) Field of Classification Search
CPC ........... H02J 7/00; H02J 7/002; H02J 7/0065; H02M 3/1582; H02M 3/1584; Y02Y 90/127; Y02T 10/7077; Y02T 10/7233; Y02T 10/7005; Y02T 10/7225; B60L 11/1812; B60L 2210/14; B60L 2210/12
USPC .................................. 320/104, 107, 109, 128
See application file for complete search history.

(56) References Cited

U.S. PATENT DOCUMENTS

| 7,750,600 | B2* | 7/2010 | Stanzel et al. | 320/116 |
| 8,143,856 | B2* | 3/2012 | Andrea et al. | 320/128 |
| 2006/0033473 | A1* | 2/2006 | Stanzel et al. | 320/128 |
| 2006/0033476 | A1* | 2/2006 | Reynolds et al. | 320/141 |
| 2009/0102417 | A1* | 4/2009 | Stanzel et al. | 320/106 |
| 2010/0156368 | A1* | 6/2010 | Huynh et al. | 323/282 |

* cited by examiner

*Primary Examiner* — Vuthe Siek
(74) *Attorney, Agent, or Firm* — Polsinelli PC

(57) ABSTRACT

Aspects of the present disclosure involve a charging system that provides a consistent specified charge power to a battery. Aspects of the disclosure also involve a bi-directional inverter charger system using boost and buck topologies substantially similar to buck and boost topologies for the charging system.

13 Claims, 6 Drawing Sheets

CRITICAL MODE CONTROL DISCONTINUOUS MODE BOOST-BUCK CHARGER

CROSS-REFERENCE TO RELATED APPLICATION

The present application is a non-provisional utility application claiming priority under 35 U.S.C. §119(e) to co-pending provisional application No. 61/479,818 titled "Uni-Directional Charger and Bi-Directional Inverter Charger" filed on Apr. 27, 2011, the disclosure of which is hereby incorporated by reference herein.

TECHNICAL FIELD

Aspects of the present disclosure n involve a charger system and components thereof, such as a power factor correcting boost topology and a buck topology, as well as a bi-directional charge and grid tie system and components thereof, including the power factor correcting buck topology and the boost topology.

BACKGROUND

Electric and hybrid vehicle charging systems involve some form of conversion between an alternating current source of power to direct current voltage and current control to charge the vehicles battery system. Alternative energy sources, such as wind farms and photovoltaic arrays, also benefit from energy storage solutions, such as battery systems, in order to store energy in the event there is not an immediate need by the grid for the energy or should there by other drivers indicating that storage is proper at a particular time. In any event, with the proliferation of sources of alternative energy and electric and hybrid vehicles, there is a need for efficient and controllable charging systems. Moreover, in many instances, such as should a vehicle owner consider using the stored energy in a vehicle battery system to provide energy to a home, there is also a need for bi-direction inverter charger topologies that can transfer energy both to a battery systems as well as tie the battery back to the grid.

It is with these and other issues in mind that various aspects of the present disclosure were developed.

SUMMARY

Aspects of the present disclosure involve an apparatus for charging an energy storage system including a rectifier configured to receive an alternating current supply voltage and provide a full wave rectified direct current voltage. The apparatus further includes a boost circuit receiving the full wave rectified direct current voltage. The boost circuit including a boost inductor coupled between the rectifier and a boost switch configuration, the boost switch across the rectifier, the boost switch configuration alternating between charging the inductor in an on state and allowing the inductor to boost the full wave rectified direct current voltage to a boosted voltage and charge a link capacitor provided in parallel with the boost switch. Finally, the apparatus includes a buck circuit configured to receive the boosted voltage from the link capacitor, the buck circuit configured to provide a substantially steady specified charge power to at least one battery, the buck circuit including a buck inductor, a buck diode and a buck switch configuration, the buck switch configuration configured to turn on to charge the boost inductor and turn off to provide a charge current to the battery, the buck switch configuration receiving a buck pulse width modulated control signal to provide the specified charge power to the battery.

BRIEF DESCRIPTION OF THE DRAWINGS

Example embodiments are illustrated in referenced figures of the drawings. It is intended that the embodiments and figures disclosed herein are to be considered illustrative rather than limiting. Also, in the drawings the like reference characters refer to the same parts throughout the different views.

DETAILED DESCRIPTION

Aspects of the present disclosure involve battery charging systems and bi-directional inverter charger systems. Each system may employ common boost and buck topologies. In a charging configuration, a diode bridge is coupled with an AC source to provide a full-wave rectified DC input to a boost configuration that boosts a rail voltage to an appropriate level for a buck configuration to provide a specified charge power to a battery source. In a bi-directional configuration, a synchronous bridge with an active clamp provides the interface with the AC source and provides a full wave rectified DC input to the boost configuration and buck configuration as arranged, in full or in part, in the charge configuration. In a grid-tie or a discharge configuration, through switches, solid state relays, or the like, the boost configuration is coupled with the battery to provide an appropriately boosted rail voltage to the buck configuration. The buck configuration then provides an appropriate discharge current to the synchronous bridge such that the output current waveform substantially matches the grid waveform.

Figure 1:
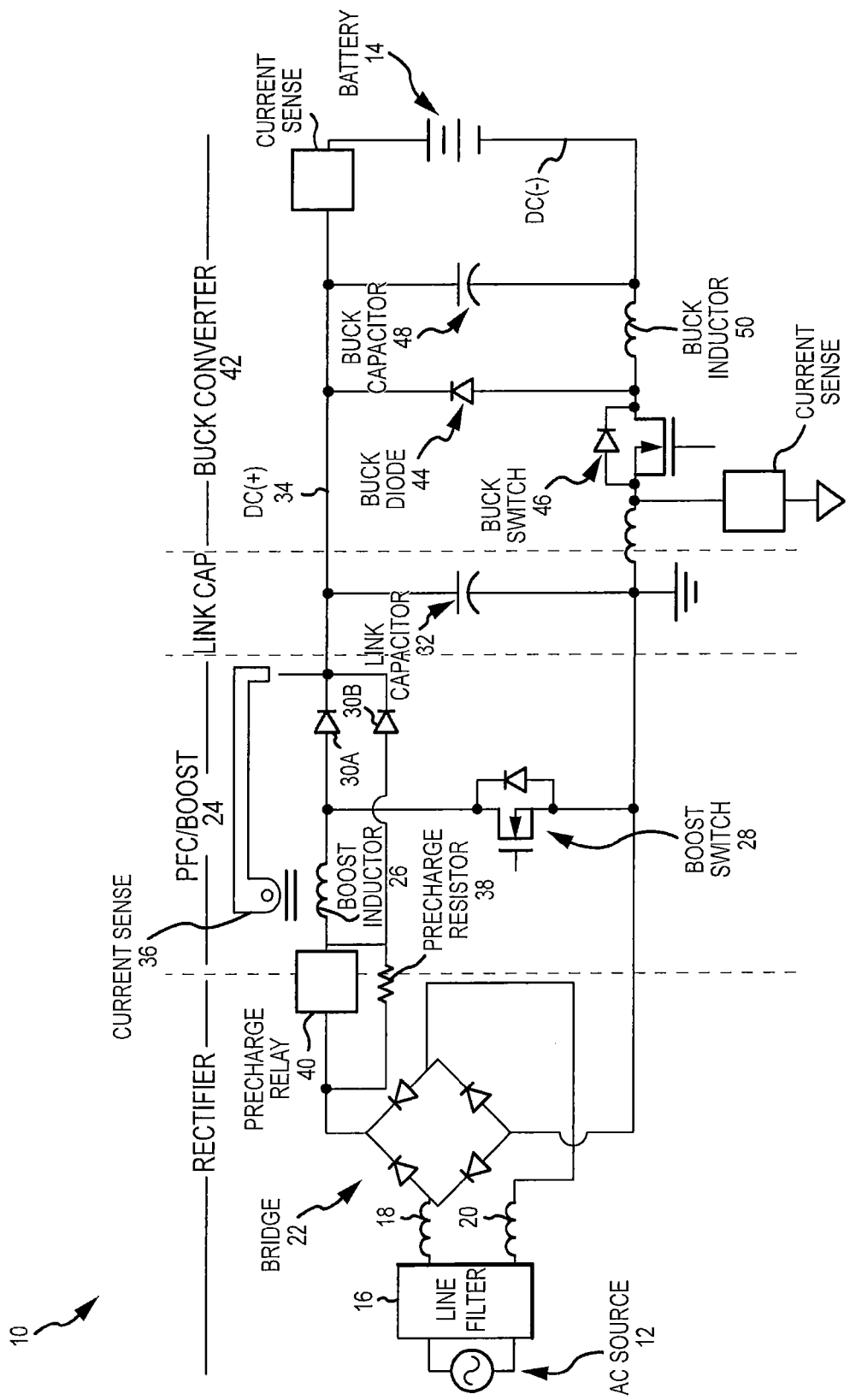
FIG. 1 is a schematic diagram of one example of a charge system and components thereof

FIG. 1 is one example of a charge system conforming to aspects of the present disclosure. The charge system 10 is arranged to draw power from an alternating current (AC) source voltage 12, which may be 120 VAC, 220 VAC, 240 VAC or otherwise, and convert the source voltage to an appropriate current and voltage form for charging a battery or battery pack 14 of varying types including nickel metal hydride and lithium ion. In one possible implementation the charge system provides a 6-10 Kilowatt (KW) charge capacity to a 240-390 volt direct current (VDC) battery pack.

The charge system is coupled with the AC source, which may be any common alternating current source, whether conforming to U.S. standards or otherwise. In one particular example, the system is configured to couple with a 240 VAC line voltage. A line filter 16 is provided at the input of the charge system. The line filter attenuates or otherwise reduces electromagnetic interference between the AC source and the charger. Additionally, line inductors (18, 20) are included between both the positive side of the AC source and the bridge 22 and the negative side of the source and the bridge 22. The line inductors are high current non-saturating inductors, in one specific implementation, that are a functional component of the boost functionality providing smoothing of the AC coupling path to a boost inductor 26. The bridge or rectifier 22, which may be bridge rectifier, may be a diode bridge in a charge configuration or as will be discussed in more detail below may include a synchronous bridge using MOSFET or other controllable bridge elements if provided in a bi-directional inverter charger configuration. The bridge provides a full-wave rectified output to a boost stage 24 that provides power factor correction and a boosted rail voltage.

The boost stage includes the boost inductor 26, a boost switch 28, and a DC link diode (30A, 30B) configured to provide a voltage boost sufficient for a specified rail voltage and to charge a link capacitor 32 to a sufficient voltage. In one arrangement, a 240 VAC input has a peak voltage of about 340 volts and hence the rectified input to the boost stage 24 has a rectified voltage of about 340 Volts. The rectified voltage is boosted to about 410 VDC through the PFC boost stage to provide sufficient voltage to the rail 34 and hence the DC link capacitor 32. Therefore, in one example, a voltage of about 50 volts is developed across the boost inductor 26. With such a voltage, 340 volts+50 volts is available to the rail and hence available to charge the link capacitor.

To charge the boost inductor 26, the boost switch 28 is configured to alternatively switch on to allow current flow through the inductor 26 to charge the inductor to the proper voltage and to switch off to allow the inductor to discharge. The diode 30A is coupled between the boost inductor and the link capacitor. The boost diode allows current to flow from the inductor when the inductor voltage exceeds the link capacitor voltage by at least the bias voltage of the diode.

In order to avoid an inrush of current to the link capacitor when the charge system is starting operation, a bypass pre-charge resistor 38 may be provided between the bridge 22 and the boost stage 24. A pre-charge relay 40 is initially open during a start-up routine, limiting current through the boost inductor 26 and the pre-charge resistor 38. The pre-charge resistor slows the flow of current into the link capacitor 32 and allows the link capacitor to initially charge at a safe rate. After the link capacitor is charged and the charge system begins operation, the relay is switched on thereby allowing current to flow through the boost inductor and by-pass the pre-charge resistor.

The DC link capacitor 32 provides a steady rail voltage to a buck stage 42. In one possible implementation, the DC link capacitor and the positive rail voltage input to the buck converter is maintained at about 390 VDC. The rail voltage and the charge current provided by the buck stage may be based on battery voltage, state of charge, battery cell type, and battery charge specifications among other factors. In the implementation discussed herein, the buck stage may be controlled to provide a specified charge power (e.g., 10 KW when two of the 5 KW chargers are operated in parallel) to a battery pack having a voltage range of between 240 VDC and 390 VDC.

The boost stage 24 and link capacitor 32 provides an up-converted DC voltage to the buck stage 42 that controls charge current to the battery. In one example, the charge power is maintained at between 5 KW and 10 KW. The buck stage includes a buck diode 44 coupled in series with a buck switch 46 between the positive rail 34 and battery ground. FIGS. 2-5 reference "DC-Neg" which is the negative output of the buck stage to the battery, "BGND" which is the buck stage ground, and ground or chassis ground, which is electrically isolated from the various circuits and is typically tied to Earth ground. The buck stage further includes a buck capacitor 48 and buck inductor 50 with the buck capacitor provided across (in parallel with) the battery, and the buck inductor provided between the negative side of the battery (cathode side of the buck capacitors) and the battery ground.

The charge power is maintained at a specified level, e.g., 5 KW or 10 KW. Generally speaking, the buck is operated in continuous conduction mode. The charge current to the battery, besides being dependent on the specified power, is dependent on the depletion level of the battery. For example, a highly discharge battery may have a lower pack voltage (e.g. 240 VDC) as compared to the pack voltage of a fully charged battery (e.g., 390 VDC). With a specified charge power, the charge current will be higher at lower battery pack voltages and lower at higher battery pack voltages to maintain the charge power. Therefore, the battery will receive a higher charge current and charge at a higher rate when it is highly discharged. While other buck topologies are possible and consistent with concepts of the present disclosure, the buck topology illustrated herein allows both convertors, buck and boost, to be at the same signal ground potential and simplifies the control design. It also positions the buck inductor 50 during flyback for effective recovery and FET drain protection with the boost rail.

Figure 2:
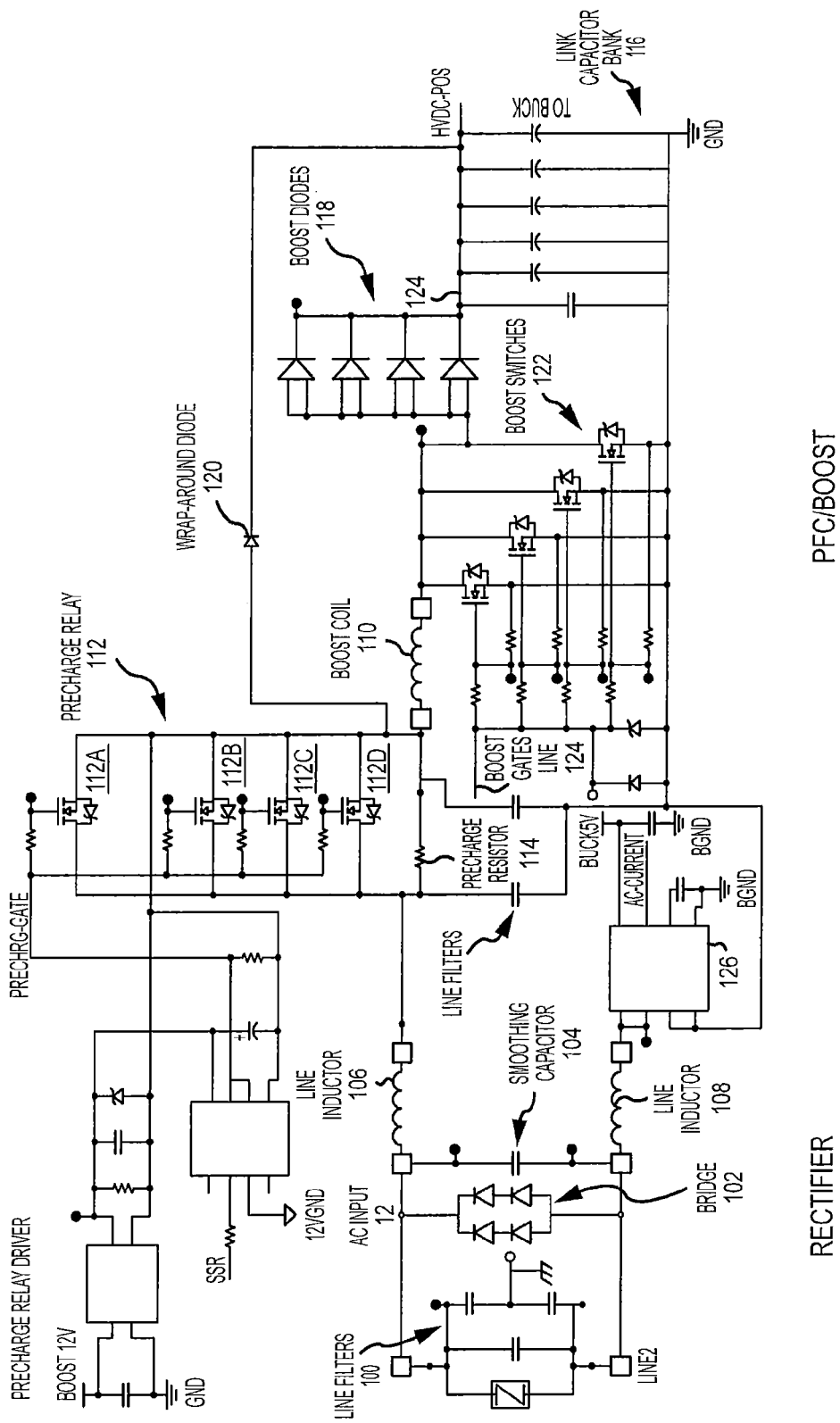
FIG. 2 is a schematic diagram of one example of a power factor correction/boost topology that may be implemented in a charge system, a bi-directional inverter-charger configuration and otherwise.

Referring now to FIG. 2, a charging system is illustrated with an input stage, including a line filter and rectifier, coupled with a power factor correction and buck stage. The system of FIG. 2 is one possible example of the rectifier and PFC/boost stages introduced in FIG. 1. At the input, a line filter 100 is coupled with a diode bridge rectifier 102. In one possible implementation, a smoothing capacitor 104 is placed across (in parallel) with the bridge rectifier thereby smoothing the full wave rectified output of the diode bridge. The rectifier provides a full wave rectified output to a pair of isolation or line inductors (106, 108), one line inductor on the positive output of the bridge and one line inductor on the negative output of the bridge. These, combined with the smoothing and DC side capacitors, decouple the high frequency, high amplitude switching currents from the line while supplying energy to a boost inductor 110. To provide power factor correction, a PWM controller (e.g. PWM controller 150, FIG. 3) commands a linear, in phase current draw through the bridge rectifier to the AC line when the boost output is loaded.

Still referring to FIG. 2, full wave rectified voltage is provided to a pre-charge relay 112 provided in parallel with a pre-charge resistor 114. In one example, the pre-charge relay includes four MOSFETS 112A-112D provided in parallel. The set of pre-charge relays are initially configured, at the beginning of operation, to force current through the pre-charge resistor 114 thereby preventing an in-rush of current through the pre-charge relays to the boost coil 110 and a link capacitor bank 116. Accordingly, the pre-charge relay is initially off and thereby current initially flows through the pre-charge resistor. In one example, the pre-charge resistor is a 50 ohm 10 watt resistor.

Both the pre-charge resistor and the pre-charge relays are coupled with the boost inductor 110 (boost coil). The boost inductor is also coupled with a set of boost diodes 118, while a wrap-around diode 120 (protection diode) is coupled between the precharge relay and the positive input of the boost rail. Stated differently, the wrap-around diode is in parallel with the combination of the boost coil and the boost diodes. A set of boost switches 122 (e.g. four MOSFETS connected in parallel) are coupled between the boost coil and the boost diodes, and ground.

In one possible implementation, the boost inductor 110 is a low permeability toroidal core type inductor. More particularly, in one arrangement, the boost inductor includes two turns on the secondary winding and 22 turns on the primary winding. The low permeability core provides a larger operating temperature range (e.g., −40 degrees Celsius to 200 degrees Celsius) compared to a high permeability core that is encouraged in the art for similar uses. With a larger temperature range the system is more adaptable to the wide range of operating conditions that may be experienced by a vehicle, for example, that might employ the technology. Moreover, in a relatively high power charge or discharge operation, the system may heat over time, and the relatively higher upper temperature limits reduces the risk of the thermal runaway and de-rating of the inductor. The low permeability, non-saturating magnetic is more efficient, owing to lower reluctance, magnetizing, and saturation losses at the frequencies, power levels, and temperatures required by some charger specifications.

The boost switches 122 are controlled by a PWM signal on the boost-gates line 124 to the gates of each respective MOSFET. The MOSFETS are active (conducting) to allow current to flow and charge the boost inductor 110, and the FETS are inactive (off and not conducting) to source current to and charge the link capacitors 116 from the boost inductors 110. When the PWM signal to the boost switches is off (during flyback), the core of the inductor 110 is depleted to about zero. The boost circuit is a critical conduction mode converter (bordering continuous mode and discontinuous mode) and is controlled by the secondary (sync winding of the boost inductor 110) signal fed to a current feedback node of the PWM boost controller 150. Whenever flyback voltage from the winding is present, the MOSFET gates (of the boost switches) are held low. At the completion of flyback, the MOSFETs conduct at a duty cycle needed to maintain the boost rail set point. The boost inductor is coupled with a bank of boost diodes 118, and when the combined voltage of the boost inductor and rectified input voltage exceeds the link voltage by at least the bias voltage of the boost diodes, current flows to and charges the link capacitor bank. When the boost switches are on and the inductor is being charged, the boost diodes (flyback diodes) prohibit current flow to the link capacitors and also prohibit the link capacitors from discharging through the boost switches.

In one possible implementation, control of the boost stage includes a negative voltage proportional to inductor current applied to the feedback node at controller 150 that suspends each on-cycle of the pulse width modulation (PWM) controller FET drive output until this v=~0. A voltage feedback node operates in an enable window of ~1.4-5 VDC and servos the control duty cycle when enabled. Control further includes a VCC under-voltage lockout feature which prevents start-up until the correct IC supply voltage is reached along with a high precision integrated PWM droop share and current limit feed back provision including a precision shunt regulator 154 receiving a resistive divider 158 feedback from the 410 VDC rail. An opto-coupler 156 is activated by the shunt regulator to provide an output that biases the set point voltage feedback node of the PWM controller. A second control signal is built by averaging the PWM drive voltage and summing this into the shunt regulator feedback, which signal causes the boost rail set point to droop proportional to load thereby supporting current sharing across parallel modules.

The wrap-around diode 120 is coupled in parallel to the boost diodes 118 and the boost coil 110, and is connected between the input side of the boost inductor 110 and link capacitors (output of the boost diodes) (i.e. the DC rail 124). The wrap-around diode protects the boost switches (MOSFETS) and related circuitry from a surge in the charge system, such as caused by a lighting strike. For example, a surge from the source and transferred through the bridge is directed around the boost switches through the wrap-around diode.

A current sense 126 (also see current sense 36, FIG. 1), is provided to measure the current through the boost inductor 110. The current waveform resembles a sawtooth pattern, with PWM control turning the boost switches 122 on at the current zero crossing to charge the boost inductor until it reaches a certain level and then turning the switches off to charge the rail 124. For example, at 5000 watts the single cycle peak can be around 65 amps, and the RMS current will be the line current.

Figure 3:
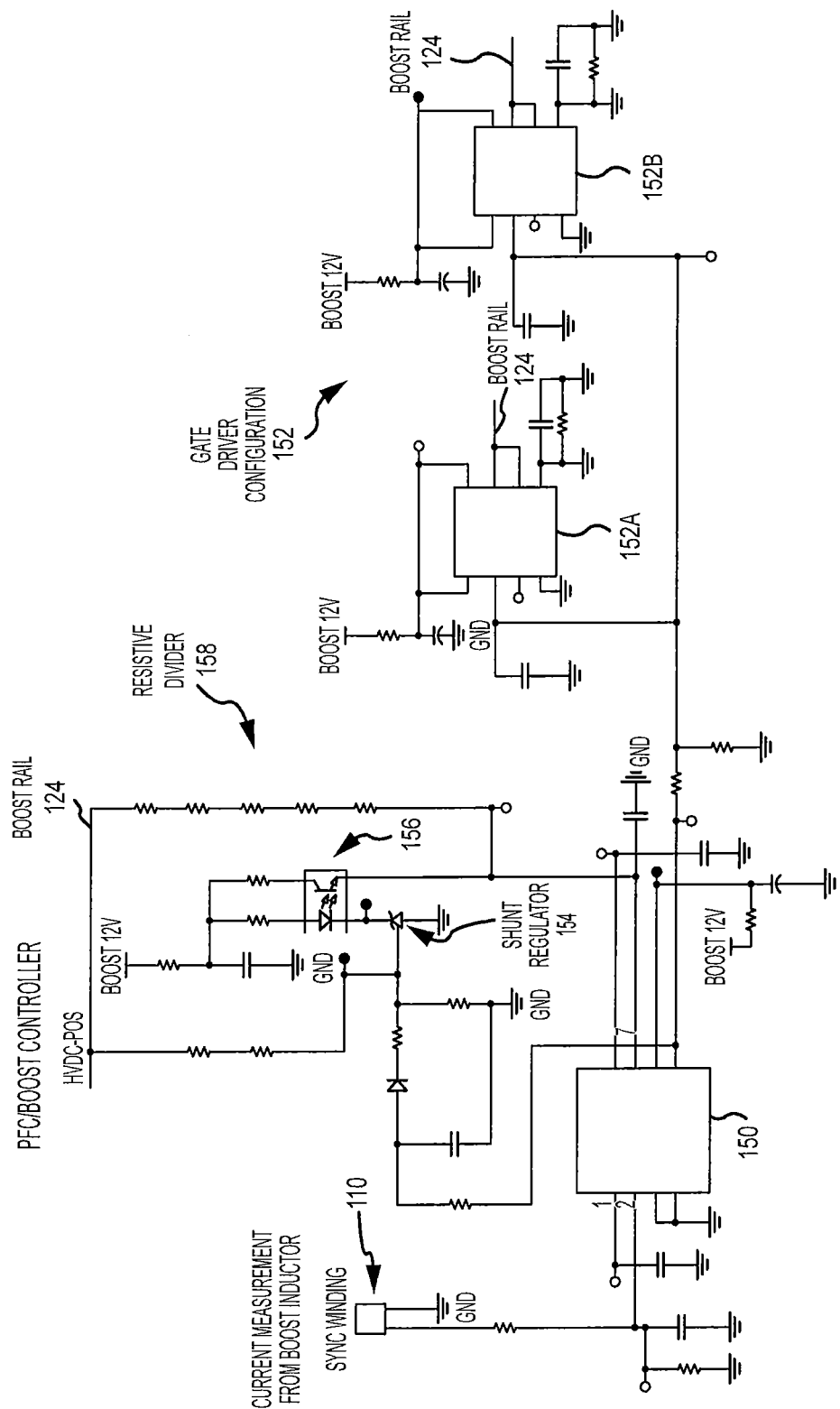
FIG. 3 is a schematic diagram of one example of control and monitoring components for the power factor correction/boost topology of FIG. 2.

FIG. 3 is a schematic diagram of PFC/Boost controller components used in the control and sensing of various aspects of the boost circuit shown in FIG. 2. A PWM controller 150, such as the 33260 controller shown, orchestrates the timing and frequency of inputs sent to a gate driver configuration 152, which may include two parallel MIC4452 drivers. The drivers supply high slew rate, high energy, sink and source currents to the gates if the boost switches. The desirable attributes of the boost behavior are derived from the support of three primary feedback points in the controller utilized in the boost design, pin1, pin2, and pin7 from FIG. 3. Pin1 determines the boost follower behavior relative to line voltage; this down regulates the boost set point in the event of low line voltage variations. Pin2 uses the inductor negative flyback voltage from the secondary winding of the boost inductor 110 to delay the onset of each succeeding cycle, this helps the efficiency and linear operation of the circuit as follows: by modulating the cycle timing (1-pulse width and 2-frequency) across the halversines of the rectified line, the circuit produces linear loading and optimal harvesting in the boost inductor relationship to the AC line. Pin7 receives setpoint information supplied by the shunt regulator 154 driven opto-coupler 156. The input at the regulator 154 is a composite signal comprised of the boost rail voltage 124 and an average of the PWM voltage. This produces a load sensitive droop feedback voltage summed with a non-loaded set-point fixed set-point voltage.

The boost circuit is configured to boost the RMS input voltage from the bridge rectifier 102 to a greater value. In one possible implementation, the boost voltage exceeds the highest expected line peak in order to achieve regulation and stability. Additionally, the boost voltage is sufficient to accommodate the maximum load voltage as regulated by the buck stage. In one example, as mentioned herein, the rail voltage is boosted to about 400 VDC or greater to charge the link capacitors 116 to between 400 VDC and 420 VDC using a 240 VAC (340 v-peak) source voltage 12. The boost circuit provides the proper boosted voltage to the buck stage that is configured to provide a specified charge power to a battery pack. The circuit topologies discussed herein may be connected to various possible source voltages in order to provide a charge current or charge power to various possible battery pack voltages, capacities, and at various possible specified charge powers.

Figure 4:
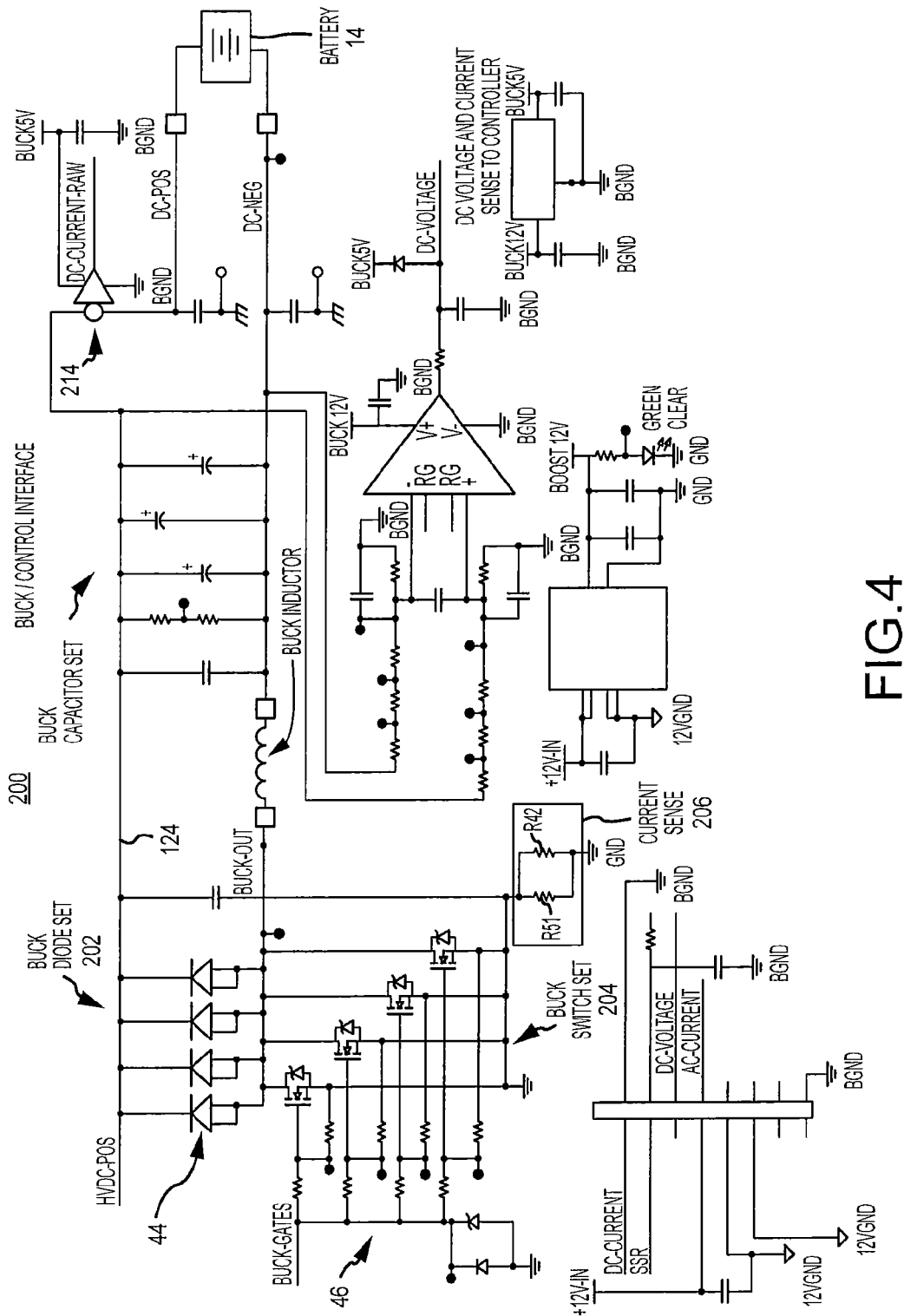
FIG. 4 is a schematic diagram of one example of a buck topology that may be implemented in a charge system, a bi-directional inverter-charger configuration and otherwise.
Figure 5:
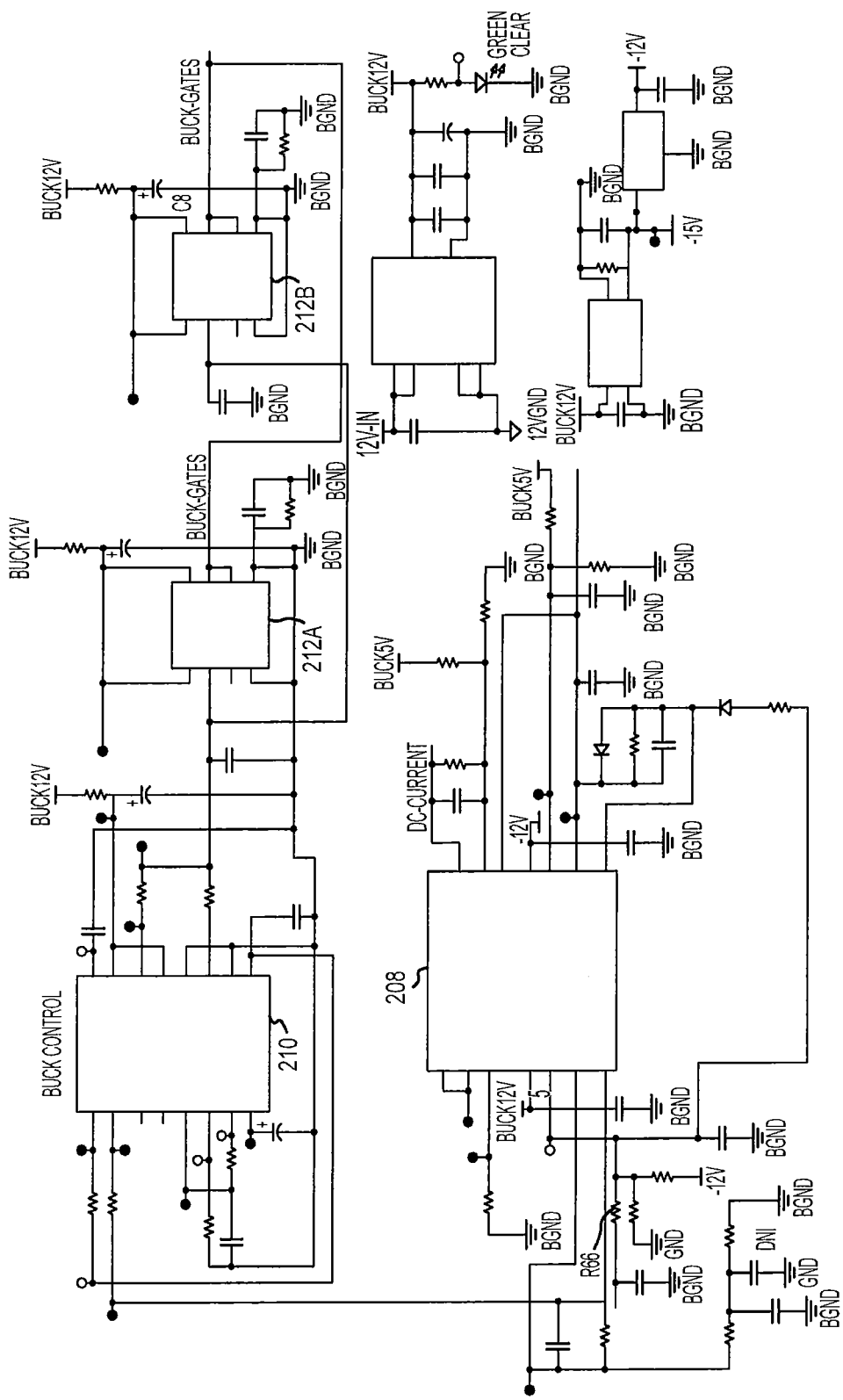
FIG. 5 is a schematic diagram of one example of control monitoring components for the buck topology of FIG. 4.

Referring now more particularly to FIG. 4, one possible implementation of a buck stage 200 is shown. The boosted voltage is provided across a buck diode 44, provided in this example by a set of four diodes 202 provided in parallel, and a buck switch 46, provided in this example by four MOSFETS 204 operating in parallel. A current sense 206 if provided to measure the current in the boost rail 124. Referring to both FIGS. 4 and 5, a buck regulator 208 impresses an output power of 0 to 5000 watts to a variable load voltage 14 from 240 VDC to 390 VDC. The power output is controlled by a 0-5 VDC command voltage received by resistor R66 and pin IC10 (208). The output wattage is directly proportional at ~1000 watts per volt of command input minus the regulation of a safe operating area (SOA) function of the IC 208, should a destructive over current occur. The buck behavior relies, at least in part, on two servo outputs from IC 208. The main servo regulating the current between the boost and buck by negatively integrating the voltage drop at resistors R42, R51 of the current sense 206 so as to down regulate the PWM signal from IC 210 and hence the duty cycle received by the gates of the buck switch set 204 through the parallel FET drivers 212A and 212B. With the addition of current in the command voltage, the servo up regulates to a setpoint of boost buck interstage current. The interstage power is thereby held constant to the command voltage. The resulting buck output current (charging current) varies inversely with load voltage producing a constant power output to the voltage variable load. The second servo is the SOA (safe operating area) amplifier of IC 208. This servo receives buck output current information from a raw PC current sense 214, and the current sense 214 measures charge current to the load 14. The second servo negatively integrates an output voltage of the current sense. The output is then summed at pin5 of IC 208 so as to prevent destructive current levels at the buck output.

Figure 6:
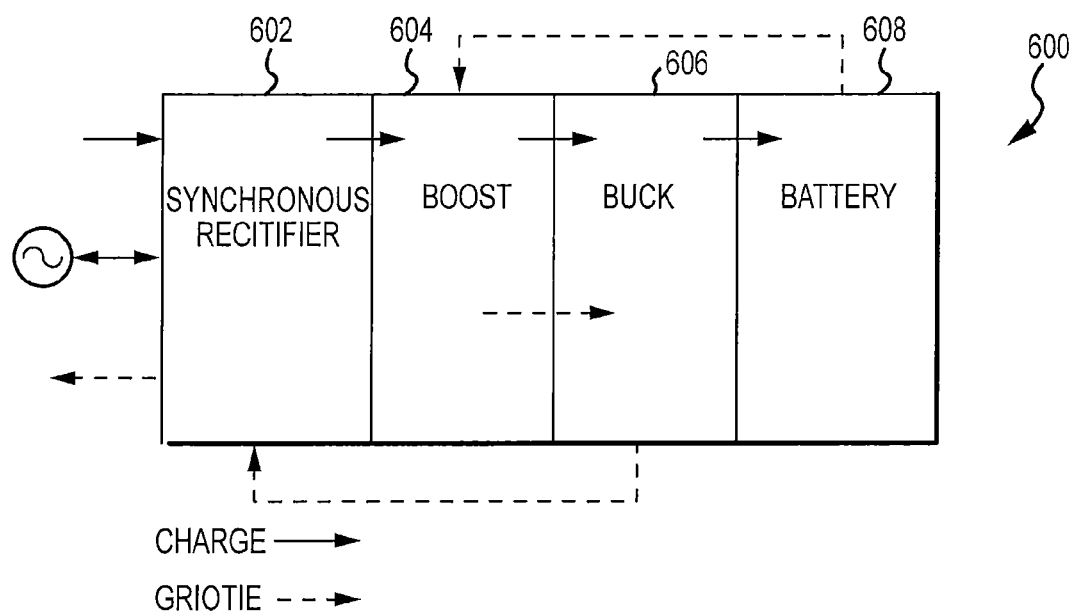
FIG. 6 is a schematic diagram of one example of a bi-directional inverter charger system employing at least a portion of the boost and buck topologies of FIGS. 2 and 4.

The buck and boost stages may also be used in a bi-directional inverter charger arrangement 600, as generally shown in FIG. 6. A bi-directional inverter charger provides a specified charge current (power to a battery) during charging, and also may couple or tie the battery to the grid in order to provide power back to the grid. In a bi-directional arrangement, a synchronous rectifier 602 is used in place of the diode bridge 102 (shown in FIG. 2). The synchronous rectifier is composed of MOSFETS in place of diodes (FET Bridge), and is able to synchronize the charge current wave form (polarity) to the grid waveform through control of the MOSFETS. In charge mode, the synchronous rectifier provides a full wave rectified DC voltage to a boost stage 604, which provides a buck stage 606 with a boosted voltage so that the buck stage can provide a specified charge power to a battery 608. In grid tie mode, the configuration of the stages is different from that of the charge mode. Namely, the battery is coupled with the boost in order to boost stage 604 the battery voltage to the proper level for the buck stage 606. The buck stage is coupled with the synchronous rectifier. The recoupling of the boost and buck stages may be accomplished through relays, switches or the like. An active clamp prevents the wrong pair of MOSFETS from turning on. The buck and boost topologies shown and described relative to FIGS. 2-5 may provide the bi-directional function discussed relative to FIG. 6.

One function of the of the active FET bridge 602 is to direct current to the AC line from a DC source with low losses and no shoot-through (destructive to the converter). The FET rectifier provides this function and can prevent shoot-through issues by the use of active clamping at the opto driver inputs. From here, the converters function to source or sink power bi-directionally by routing the power flow with relays. The disclosed buck converter can be configured to output it's power sinusoidally with the existing servos and a rectified line synchronized negatively integrated amp stage feedback available at IC10.

In some embodiments, the charging system 10 may include two charging systems such as those described in the circuits above (FIGS. 2-5), connected in parallel to provide a particular uni-directional and/or bi-directional inverter charge. For example, two 5kW charging circuits may be connected in parallel to provide a 10kW charger. Similar to that described above, such an embodiment may provide a charge to a battery pack of an electric or hybrid electric vehicle. In additional, one or more charging components may also be coupled to the charging system described herein. For example, a 420 W/14 VDC charger may be coupled to the embodiments described above as a portion or addition to the charging system. Such a configuration may be utilized and connected to a controller area network (CAN) bus of a vehicle to power the CAN bus during operation of the vehicle to allow the components of the vehicle to communicate over the CAN.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present disclosure may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. An apparatus for charging an energy storage system comprising:
a rectifier configured to receive an alternating current supply voltage and provide a full wave rectified direct current voltage;
a boost circuit receiving the full wave rectified direct current voltage, the boost circuit including a boost inductor coupled between the rectifier and a boost switch configuration, the boost switch across the rectifier, the boost switch configuration alternating between charging the inductor in an on state and allowing the inductor to boost the full wave rectified direct current voltage to a boosted voltage and charge a link capacitor provided in parallel with the boost switch; and
a buck circuit configured to receive the boosted voltage from the link capacitor, the buck circuit configured to provide a substantially steady specified charge power to at least one battery, the buck circuit including a buck inductor, a buck diode and a buck switch configuration, the buck switch configuration configured to turn on to charge the boost inductor and turn off to provide a charge current to the battery, the buck switch configuration receiving a buck pulse width modulated control signal to provide the specified charge power to the battery.

2. The apparatus of claim 1 wherein the boost inductor is a low permeability inductor with a two turn secondary winding and a 22 turn primary winding.

3. The apparatus of claim 1 further comprising a pulse width modulation controller that provides a pulse width modulated control signal to the boost switch configuration, the control signal configured to deplete a boost inductor core of the boost inductor to about 0 before turning on the boost switch configuration to charge the boost inductor.

4. The apparatus of claim 3 further comprising a pulse width modulate control signal to the boost switch configuration, the control signal being of variable width depending on a voltage level of the full wave rectified direct current voltage, the width being narrower at line peak voltage and being wider away from the peak voltage, the control signal also depending on a specified charge voltage of the link capacitor.

5. The apparatus of claim 4 further wherein the pulse width modulation controller receives a feedback signal from a secondary winding to hold gates of the boost switches while flyback voltage is present in the secondary winding.

6. The apparatus of claim 1 further comprising a boost diode between the boost inductor and the link capacitor, the boost diode preventing the link capacitor from discharging through the boost switch configuration.

7. The apparatus of claim 6 further comprising a precharge relay in series with the boost inductor and a precharge resistor in communication with the link capacitor, the precharge relay configured to shunt current through the precharge resistor to charge the link capacitor, the precharge relay further configured to close and allow current through the boost inductor and by-pass the precharge resistor.

8. The apparatus of claim 7 further comprising a wrap-around diode connected between the precharge relay and the link capacitor, the wrap-around diode providing protection in the event of a power surge.

9. The apparatus of claim 1 wherein a pulse width modulated control signal is provided to the boost switch configuration, the boost switch configuration including at least one MOSFET, the PWM control signal operating at a frequency to substantially prevent the at least one MOSFET from operating in a linear region of the MOSFET.

10. The apparatus of claim 1 wherein the buck circuit is operated in a continuous conduction mode.

11. The apparatus of claim 1 further comprising at least one current sense configured to measure current flowing to and from the at least one battery such that a charge power to the at least one battery is held substantially constant regardless of the at least one battery voltage.

12. The apparatus of claim 1 wherein:
the boost circuit comprises means for boosting a DC rail voltage to the link capacitor, and
the buck circuit comprises means for regulating the charge power to the battery.

13. The apparatus of claim 1 wherein:
the rectifier is a bride rectifier including a plurality of MOSFETs, the bridge rectifier configured to receive an alternating current supply voltage and provide a full wave rectified direct current voltage or configured to deliver a discharge current to the alternating current supply;
the boost circuit connected to the bridge rectifier in charge mode or to a battery in discharge mode, and
the buck circuit connected to the boost circuit in charge mode or to the bridge rectifier in discharge mode.

* * * * *